Dec. 18, 1934.                K. RATH                1,985,058
                         GAS DISCHARGE DEVICE
                         Filed Feb. 18, 1932
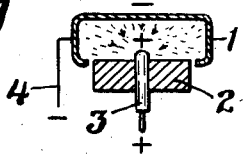
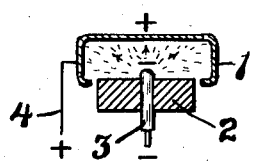
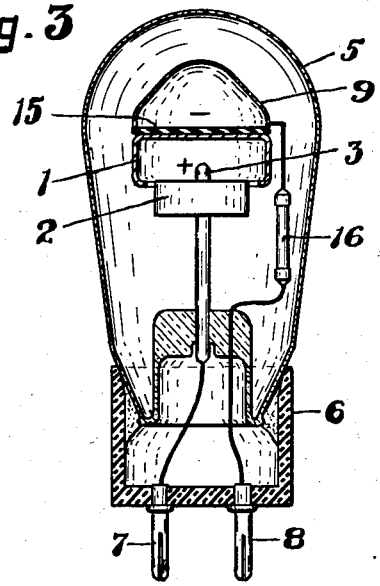
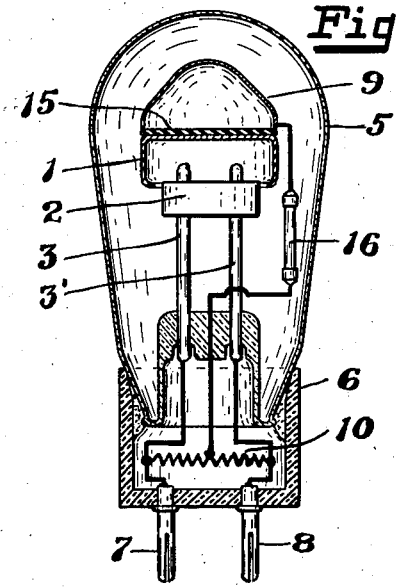
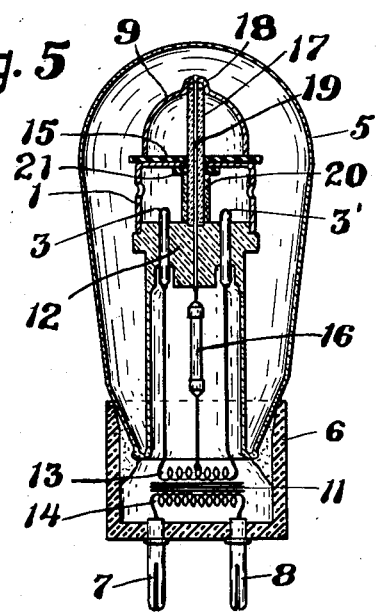
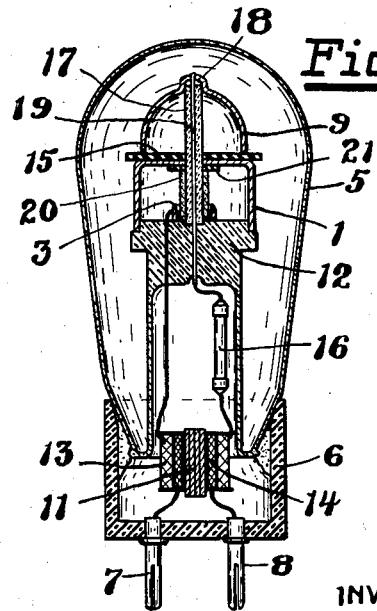
INVENTOR
Karl Rath
BY
*Samuel Ostrolenk*
ATTORNEY Patented Dec. 18, 1934

1,985,058

UNITED STATES PATENT OFFICE 1,985,058

GAS DISCHARGE DEVICE

Karl Rath, New York, N. Y., assignor to The Radio Patents Corporation, New York, N. Y., a corporation of New York Application February 18, 1932, Serial No. 593,699

6 Claims. (Cl. 250—27.5)

My invention relates to discharge devices, more particularly to gaseous conduction lamps operated by direct current.

In many instances, it is desired to operate gaseous discharge devices by direct current for producing certain effects, such as for instance, a glowing effect on the surface of an electrode, preferably the negative electrode having a desired shape for advertising and the like purposes.

In another embodiment of the invention, in combination with a glow discharge lamp operated by a direct current, a regularly or irregularly moving glow is produced primarily intended for advertising and display purposes, as will be described in more detail hereinafter.

The object of the present invention is to provide means in connection with glow discharge devices of the aforementioned type for enabling direct operation from an alternating current system.

Another object of the invention consists in providing a combined glow discharge and rectifier structure for a single lamp in such a manner as to enable direct operation from an alternating current supply system.

A further object of my invention consists in the provision of a unitary glow discharge and gaseous rectifier structure embodied in a single device, such as a glow discharge lamp.

Another object of the invention is to provide a gaseous conduction lamp in which the gaseous atmosphere is utilized for the double purpose of producing both an illuminating glow and for rectifying an alternating supply current, respectively.

These and further objects and novel aspects of my invention will become more apparent as the following detailed description proceeds, taken with reference to the accompanying drawing in which I have illustrated a few embodiments for carrying the invention into effect.

I wish it to be understood, however, that the description as follows and the drawing are to be regarded as illustrative only of the broad underlying principle in accordance with the invention which, as will become obvious, is subject to various modifications and variations coming within its broader scope and spirit, such as expressed in the appended claims.

Figures 1 and 2 illustrate the method of rectification utilized in accordance with the embodiments of the invention shown in the remaining figures.

Figure 3 shows in a schematic manner a simple arrangement of a gaseous conduction lamp in accordance with the invention.

Figure 4 illustrates a similar lamp to Figure 3 by which both alternations of the supply current are utilized.

Figure 5 shows a construction of a glow discharge lamp in accordance with the invention utilizing both half waves of the alternating supply current.

Figure 6 illustrates a similar construction to Figure 5 for utilizing a single half wave with a transformer included in the lamp base.

Similar reference numerals identify similar parts throughout the different views of the drawing.

As already mentioned, I shall illustrate the invention as embodied in a glow discharge lamp for illumination purposes comprising substantially a pair of cathode and anode electrodes properly shaped and spaced from each other and included in a gaseous atmosphere of suitable composition and pressure. By applying suitable operating voltage to the electrodes of such lamp and by properly limiting the current, such as by means of a resistor connected in series with one of the voltage supply leads to the electrodes, the glow appearing upon the surface of the cathode electrode, known as the cathode glow, may be limited to a portion of the cross section area of the discharge path from the cathode to the anode electrode in such a manner that irregular or regular movements, preferably circular movements, of the glow may be obtained.

In order to secure such an effect, it was found preferable to use a direct operating current for such a tube. For further details of this discharge lamp, reference is made to United States application, Serial Number 371,004, filed June 14, 1929.

In accordance with the underlying novel idea of the present invention, a discharge tube of the aforementioned type or in general any discharge tube requiring direct current for its operation may be supplied from an alternating current system by including within the tube itself means for rectifying the alternating current preferably in accordance with the well-known principle of gas tube rectifiers, as illustrated in Figures 1 and 2 of the drawing.

In a preferred embodiment of the invention, as shown by the figures in the drawing, the entire glow discharge path is subdivided into at least two portions, one portion of which serves for rectifying the alternating supply current and the other portion of which is utilized for producing the particular effect for which the lamp is intended, such as an advertising glowing surface as above described.

Referring to Figures 1 and 2 of the drawing, these illustrate the principle of the well-known gaseous rectifier comprising substantially a cathode electrode 1 having a large surface area and a cooperating anode electrode 3 of small surface area as compared to the cathode, and held by an insulating block 2 through one side of which the anode protrudes, as shown. The electrodes are included in a vessel filled with a gaseous atmosphere such as neon, helium, or a proper mixture thereof at a definite low pressure. At 4 I have shown a connecting lead to the cathode electrode.

If an alternating current is applied to such cathode and anode electrodes, it will be found that the current carrying capacity from the cathode 1 to the anode 3 when the former is at a positive potential during one of the half cycles of the current (Fig. 2), is comparatively smaller or practically zero as compared to the current carrying capacity from the anode 3 to the cathode 1 when the latter is at negative potential (Fig. 1) during the other half cycle of the alternating current. The explanation of this effect which, as is readily understood results in a rectifying action dependent chiefly upon the difference in the size of the two electrodes, may be summed up in a few words by saying that the positive ions will find their way readily to the large surface 1 and take on electrons when this electrode is negatively charged by the alternating voltage (Fig. 1) from the system to which the electrodes are connected. However, with the reversal of voltage, the smaller surface 3 becomes negative (Fig. 2) and its ability to furnish electrons to the positive ions is greatly lessened because the positive ions cannot gather in large quantities around the small surface.

This well known principle of rectification is utilized in accordance with the invention for operating a gaseous device directly from an alternating current system, a simple embodiment of such a device being illustrated in Figure 3. The latter shows a tube or bulb 5 including the electrode elements and filled with a gaseous atmosphere of proper composition and pressure. The tube is mounted on a base 6 which is provided with connecting prongs 7 and 8 for connection to an alternating supply circuit. In place of the prongs 7 and 8, the tube may be provided with any of the well-known connecting terminals such as preferably the known screw type Edison connector for direct insertion into the standard light socket in use universally.

The rectifying part of the discharge system comprises the anode 3 in the form of a thin rod and the cathode 1 of substantially larger surface and having for instance cup-shape similar as described in Figures 1 and 2. The anode 3 is held by an insulating block 2 through which it protrudes to a definite distance. Cooperating with the electrode 1 is a further main electrode 9 in the example shown having the shape of a hollow globe and connected in series with a resistor 16 to the terminal 8, the remaining terminal 7 being connected to the rod-shaped anode 3.

Thus, the entire discharge path is divided up into two portions, one portion between the electrodes 3 and 1 constituting the rectifying part of the discharge operating in accordance with the principle described in Figures 1 and 2, and the second portion between the electrodes 1 and 9 serving for producing the intended operation, such as a negative illuminating glow on the surface of the electrode 9. This latter, as will be readily seen, is a negative electrode with regard to the electrode 1, thus producing a bright negative glow, as is well known. The resistor 16 serves for regulating the amount of current flow, thus controlling the illumination effect or, in the case of proper spacing and design of the discharge path from 1 to 9, regulating the rate of motion or rotation, respectively, of the glow appearing upon the electrode 9.

In a construction in accordance with Figure 3, only one half cycle of the alternating supply current is utilized and in order to utilize both half cycles of the current, an embodiment may be used as illustrated in Figure 4 which differs from Figure 3 in that there are two anode rectifying electrodes 3 and 3', respectively, of small surface area cooperating with the common cathode 1.

The cathode 1 may be covered with an insulating layer 15 such as a sheet of mica or the like, properly provided with recesses or other irregularities for the electric discharge for producing a desired animating effect of the cathode glow appearing on the operating electrode 9. In order to enable both half cycles to be utilized, it is further necessary to provide an impedance element 10, such as an ohmic resistance or inductance coil, the ends of which are connected to the supply terminal at 7 and 8, and the mid-point of which is provided with a tap connected to the operating cathode 9. A resistance 16 may again be connected in series with the cathode lead but such resistance may, under circumstances, be omitted in that the element 10 will serve as such resistance.

In Figure 5 I have illustrated a further construction of a discharge tube for utilizing both halves of the alternating current wave with a small transformer included in the tube base for producing the proper operating voltage in the case that the supply voltage is not high enough for producing the effects intended. The transformer 11 comprises a primary 14 connected to the input terminals 7 and 8 and a secondary 13 tapped at its mid-point and connected again in series with the resistor 16 to the operating cathode 9. The latter has been shown to have the form of a hollow hemisphere held by a central support in the form of a ceramic tube 17 mounted upon the stem or press 12 of the tube. The connecting wire 19 is passed through the tube 17 and soldered on or otherwise connected to the cathode 9 as shown.

In order to secure sufficient insulation and to properly hold the electrodes in position, I have furthermore shown an insulating sleeve 20 surrounding the supporting tube 17 and an insulating washer 21 such as of mica and the like material, arranged underneath and close to the electrode 1.

In Figure 6 I have shown a similar device to Figure 5 in a simplified manner in that only one half cycle of the alternating supply current is utilized. Inasmuch as these tubes will hardly consume more than a few milliamperes, no substantial loss is entailed when utilizing only one half cycle of the current and in view of the simplified structure this type of tube is especially adapted for practical uses for direct insertion into an alternating current lamp socket in which case, as already pointed out, the well known standard Edison base may be used instead of the connecting prongs 7 and 8 as shown herein for the purpose of illustration. Furthermore, the transformer 11 inserted in the base of the tube may be of very small size and can be made at very low cost in view of the extremely small power consumption of the tube.

According to Figure 6, the output terminals of the transformer are connected on the one hand to the hemispherical cathode or operating electrode 9 in series with resistor 16 and through the central lead 19 passing the supporting tube 17, similar to the construction as described in Figure 5. In place of the two rectifying anodes 3 and 3' a single anode 3 is provided of cylindrical shape preferably with a sharp edge, as shown, and concentrically surrounding the supporting tube 17 and the insulating sleeve 20. This anode electrode is connected to the remaining output terminal of the transformer 11 in accordance with the spirit of the invention.

While I have illustrated the invention embodied in a discharge lamp in which the rectifying portion and the operating portion of the discharge are connected in series with regard to the supply current, it is understood that I am not limited to such arrangement and that for instance, the operating discharge portion and the rectifying discharge portions may be arranged in parallel relationship with each other or they may be entirely separated and different electrode systems used for rectifying and operating purpose, respectively, as is obvious.

I claim:

1. A glow discharge illuminating device comprising a vessel filled with a gaseous atmosphere; input terminals for said vessel; a first electrode of substantially flat shape; a second dome-shaped cooperating electrode resting upon and insulated from said first electrode and connected to one of said input terminals; and a rod-shaped auxiliary electrode spaced in cooperative relation with regard to said first electrode and connected to said other input terminal.

2. A glow discharge illuminating device for producing a regularly moving negative glow comprising a vessel; a gaseous atmosphere in said vessel; a first main electrode within said vessel; a second cooperating main electrode spacially disposed with regard to said first electrode; a pair of auxiliary electrodes spacially disposed with regard to said second electrode and having a surface area comparatively small with regard to said second electrode for producing a full wave gaseous rectifying path for rectifying alternating operating current for said main electrodes; a base supporting said vessel; and an input transformer mounted in said base, the output terminals of said transformer being connected each to one of said auxiliary electrodes; and a connection from the center point of said transformer secondary to said first main electrode.

3. A glow discharge illuminating device for producing a regularly moving negative glow comprising a vessel; a gaseous atmosphere in said vessel; a first main electrode within said vessel; a second cooperating main electrode spacially disposed with regard to said first electrode; a pair of auxiliary electrodes spacially disposed with regard to said second electrode and having a surface area comparatively small with regard to said second electrode for producing a full wave gaseous rectifying path for rectifying alternating operating current for said main electrodes; a base supporting said vessel; electrical impedance means mounted in said base, the end terminals of said impedance means being connected each to one of said auxiliary electrodes; and a connection from the center point of said impedance means to said main electrodes.

4. A cathode glow discharge lamp comprising a vessel housing a single active chamber; a gaseous atmosphere in said chamber; positive and negative electrodes within said chamber; and means for directly operating said lamp from an alternating current supply comprising a further electrode of small surface area relative to said positive electrode and spaced therefrom to provide a rectifying path in series with the main discharge path between said anode and cathode electrode; and terminal means for connecting said discharge paths to a current supply source.

5. A cathode glow discharge lamp comprising a vessel housing a single active chamber; a gaseous atmosphere in said chamber; a first main electrode; a cooperating second main electrode; means for directly operating said lamp from an alternating current supply comprising a further electrode of small surface area relative to one of said main electrodes and spaced therefrom to provide a rectifying path to change applied alternating current into direct current for operating said lamp and input terminal means for said electrodes for connecting said discharge lamp to a current supply source.

6. A gas filled negative glow multi-unit discharge tube comprising a full wave rectifier and a cathode glow unit wherein the cathode of the full wave rectifier is the anode of the cathode glow unit and the cathode glow unit and the rectifier are connected in series with reference to the current leads.

KARL RATH.